US008648131B2

(12) United States Patent
van der Waal et al.

(10) Patent No.: US 8,648,131 B2
(45) Date of Patent: *Feb. 11, 2014

(54) PROCESS FOR THE PREPARATION OF AN ARTIFICIAL LATEX

(75) Inventors: Arwin W. van der Waal, Ammerstol (NL); Marc S. Sonderman, Purmerend (NL); Stephen W. Bourne, Oostzaan (NL); Adrie A. van der Huizen, Castricum (NL); Alexandre Rodrigues da Silva, Sao Paulo (BR); David H. Brooks, Parkersburg, WV (US)

(73) Assignee: Kraton Polymers U.S. LLC, Houston, TX (US)

( * ) Notice: Subject to any disclaimer, the term of this patent is extended or adjusted under 35 U.S.C. 154(b) by 398 days.

This patent is subject to a terminal disclaimer.

(21) Appl. No.: 13/002,661

(22) PCT Filed: Jul. 6, 2009

(86) PCT No.: PCT/US2009/049685
§ 371 (c)(1),
(2), (4) Date: Jan. 5, 2011

(87) PCT Pub. No.: WO2010/005895
PCT Pub. Date: Jan. 14, 2010

(65) Prior Publication Data
US 2011/0112217 A1    May 12, 2011

(30) Foreign Application Priority Data
Jul. 7, 2008  (NL) .................................. 2001776

(51) Int. Cl.
C08G 18/08     (2006.01)
C08J 3/00      (2006.01)

(52) U.S. Cl.
USPC ......... 523/340; 523/343; 524/575.5; 366/147

(58) Field of Classification Search
USPC ......... 523/340, 343; 524/575.5, 571; 366/147
See application file for complete search history.

(56) References Cited

U.S. PATENT DOCUMENTS

| | | | |
|---|---|---|---|
| 2,595,797 A | 5/1952 | Leyonmark et al. | |
| 2,799,662 A | 7/1957 | Ernst et al. | |
| 2,871,137 A | 1/1959 | Lee et al. | |
| 2,947,715 A | 8/1960 | Maxime et al. | |
| 2,955,094 A | 10/1960 | Brodkey et al. | |
| 3,003,930 A | 10/1961 | Wood et al. | |
| 3,007,852 A | 11/1961 | Allen et al. | |
| 3,249,566 A | 5/1966 | May | |
| 3,250,737 A | 5/1966 | Halper et al. | |
| 3,261,792 A | 7/1966 | Halper et al. | |
| 3,268,501 A | 8/1966 | Crouch et al. | |
| 3,277,037 A | 10/1966 | Halper et al. | |
| 3,281,386 A | 10/1966 | Dudley | |
| 3,285,869 A | 11/1966 | Ronay et al. | |
| 3,287,301 A | 11/1966 | Fysh et al. | |
| 3,294,719 A | 12/1966 | Halper et al. | |
| 3,305,508 A | 2/1967 | La Heij et al. | |
| 3,310,151 A | 3/1967 | Carter | |
| 3,310,516 A | 3/1967 | La Heij et al. | |
| 3,313,759 A | 4/1967 | La Heij et al. | |
| 3,320,220 A * | 5/1967 | Di Drusco et al. | 528/499 |
| 3,424,705 A | 1/1969 | La Heij et al. | |
| 3,445,414 A | 5/1969 | Glymph et al. | |
| 3,503,917 A | 3/1970 | Burke | |
| 3,583,967 A | 6/1971 | Hattori et al. | |
| 3,622,127 A | 11/1971 | Burke | |
| 3,644,263 A | 2/1972 | Burke | |
| 3,652,482 A | 3/1972 | Burke | |
| 3,719,572 A | 3/1973 | Burke | |
| 3,808,166 A | 4/1974 | Bruzzone et al. | |
| 3,815,655 A | 6/1974 | Burke | |
| 3,839,258 A | 10/1974 | Visseren et al. | |
| 3,842,052 A | 10/1974 | Gordini et al. | |
| 3,862,078 A | 1/1975 | Burke | |
| 3,879,327 A | 4/1975 | Burke | |
| 3,886,109 A | 5/1975 | Van Hardeveld et al. | |
| 3,892,698 A | 7/1975 | Burke | |
| 3,920,601 A | 11/1975 | Yoshioka et al. | |
| 4,160,726 A | 7/1979 | Delpico | |
| 4,243,566 A | 1/1981 | Burke | |
| 4,344,859 A | 8/1982 | Burke | |
| 6,075,073 A | 6/2000 | McGlothin et al. | |
| 8,163,838 B2 * | 4/2012 | Van Der Huizen et al. | .. 524/571 |
| 2009/0209698 A1 * | 8/2009 | Van Der Huizen et al. | .. 524/571 |

FOREIGN PATENT DOCUMENTS

| | | |
|---|---|---|
| DE | 2245370 A1 | 3/1973 |
| EP | 0339559 A2 | 2/1989 |
| EP | 512736 B1 | 7/1998 |
| FR | 2153913 A5 | 4/1973 |
| GB | 865854 A | 12/1960 |
| GB | 1004441 A | 9/1965 |
| GB | 1199325 A | 7/1970 |
| GB | 1296107 A | 11/1972 |
| GB | 1384591 A | 2/1975 |
| GB | 2051086 B | 1/1981 |
| JP | 51080344 B | 7/1969 |
| JP | 48038337 | 11/1973 |
| JP | 54124040 B | 9/1979 |
| JP | 56161424 B | 12/1981 |
| JP | 58091702 B | 5/1983 |
| JP | 58147406 B | 9/1983 |
| JP | 1123834 B2 | 5/1989 |
| JP | 8120124 B | 5/1996 |
| NL | 287078 A | 12/1962 |
| RO | 102665 A | 12/1992 |
| SU | 1014834 A | 4/1983 |
| SU | 1058974 A | 12/1983 |
| SU | 1375629 A | 2/1988 |

\* cited by examiner

OTHER PUBLICATIONS

Ch. 9, Stanford Research Institute, PEP Report No. 82, Dec. 1972.

*Primary Examiner* — Hannah Pak
(74) *Attorney, Agent, or Firm* — Gregory N. Clements; Michael A. Masse

(57) ABSTRACT

Accordingly, the invention provides a process for the preparation of an artificial latex, comprising the steps: (a) emulsification of a cement comprising a rubber dissolved in a suitable organic solvent, together with an aqueous surfactant solution, thus forming an oil-in-water emulsion; (b) step-wise reduction of the solvent content of the oil-in-water emulsion in two or more stages resulting in an artificial latex. In addition, the invention provides a continuous stirred vessel for removing an organic solvent from an oil-in-water emulsion comprising rubber dissolved in an organic solvent.

18 Claims, 2 Drawing Sheets

PROCESS FOR THE PREPARATION OF AN ARTIFICIAL LATEX

TECHNICAL FIELD

Figure 1:
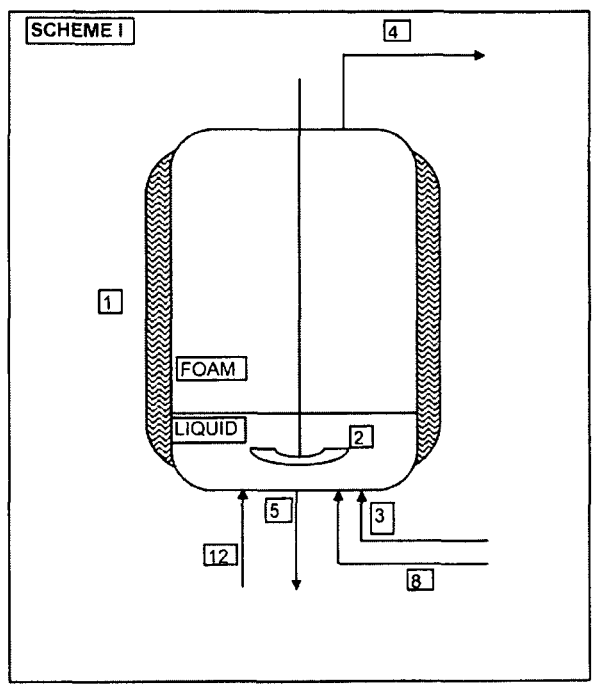

The present invention concerns a process of producing artificial latex, comprising a man-made emulsion of a rubber in water. More in particular, the invention concerns the preparation of a conjugated diene polymer latex, more specifically an isoprene rubber latex.

BACKGROUND ART

Both natural and synthetic rubber latexes are emulsions of rubber in water. The emulsions are stabilized with proteins or surface-active agents. The median diameter of rubber particles average varies from 0.5 to 2.0 micron. It may be as low as 0.1 micron for some synthetic latexes and tends to be nearly 1 micron for natural latex. The term "latex" is applied to synthetic as well as natural products, and stems from the botanical name of the milky fluid that is derived from rubber trees and which is the source of natural rubber. The term "serum" is used for the aqueous medium.

The process of producing emulsions of rubber in water has been known for many years. For instance, in U.S. Pat. No. 2,595,797 a process with the following steps is disclosed:
1. preparing a solution of a rubber like polymer in a water-insoluble volatile organic solvent in a concentration sufficient for emulsification
2. introducing the solution under pressure into water containing a surface active agent (e.g., dioctyl ester of sodium sulfo-succinic acid)
3. adding an antifoamant (e.g., polysilicone oil) and agitating the mixture until emulsion is obtained
4. removing the solvent by flashing (whilst avoiding excessive foaming)
5. concentrating the solids content of the emulsion by allowing the emulsion to stand for 24 hours and removing the serum (containing less than 2% solids.

In U.S. Pat. No. 2,799,662 a similar process is described. The method consists of a number of integrated steps which include the dissolving of the dry polymeric material (e.g., rubber) in a suitable selected solvent, dispersing the thus prepared polymer solution into a carefully selected and adjusted water-emulsifier system and, finally, stripping out the solvent to leave the polymer dispersion. According to this reference, in the preparation of the aqueous emulsifier system, it is highly desirable to have two emulsifiers present, one of the type which is hydrocarbon soluble (e.g., alkali metal petroleum sulfonates having 20 to 21 carbon atoms arranged in an alkyl-aryl structure) and one of the water soluble type (e.g., alkali metal sulphate derivatives of higher alcohols). Emulsification of the polymer solvent mixture and the aqueous emulsifier mixture is accomplished under conditions preventing flashing of the solvent.

The problem of emulsion stability when stripping off the solvent is addressed in U.S. Pat. No. 2,871,137, which provides a method for preparing emulsifying agents based on the hydrocarbon polymers that are emulsified.

A method for preparing stable emulsions of polymeric or resinous materials is furthermore described in U.S. Pat. No. 2,947,715. This is accomplished by dissolving the rubber or resin in a suitable solvent, adding a creaming agent to the polymer solution during emulsification, and creaming the resultant latex prior to removal of the solvent, removing the solvent and then again creaming the solvent-free latex.

In U.S. Pat. No. 2,955,094, ortho-phosphoric acid and organic sulphate salts are used as emulsifiers in the preparation of emulsion latexes from hydrocarbon polymers. As indicated in this reference, experience has shown that latexes are relatively unstable and tend to coagulate when subjected to mechanical stress. Mechanical instability may be brought about by the simple movement of an agitator stirring the colloid. Maintenance costs are increased because the equipment becomes coated with the coagulated rubber and furthermore, an appreciable quantity of the rubber is lost. Another type of instability encountered with polymer latexes is that they oil-out and develop coagulum during the solvent stripping step.

U.S. Pat. No. 3,250,737 sets out to produce concentrated latexes of synthetic elastomers from organic solutions thereof in a manner that is both rapid, efficient and economical. This is accomplished by mixing a solution of a synthetic elastomer in an organic solvent, water and an emulsifying agent, homogenizing the mixture at least until the resulting emulsion is stable, stripping the organic solvent at elevated temperatures and pressures below conditions at which water boils, centrifuging the resulting dilute aqueous latex, recovering and recycling the aqueous serum from the said centrifuging step and recovering the concentrated latex. This reference concentrates on the steps of flashing and centrifuging, it is immaterial how the hydrocarbon solution is made.

To give an impression of the overall process as described in the prior art, reference is made to the process in Chapter 9 of the Stanford Research Institute, PEP Report No. 82 of December 1972. Thus, a solution of polyisoprene in isopentane is fed to a premix tank, where it is premixed with a surfactant solution (mostly serum recycle) from the serum storage. The mixture is fed to an emulsification loop in which the recycle to fresh feed ratio is about 2/1. The emulsifier is a high speed (3,500 rpm) centrifugal pump. The emulsion passes to a hold tank where the emulsion is held for 3 hours, permitting any "cream" (emulsion with oversize particles) to rise to the top and be recycled. About 1% emulsion is thus recycled to ensure complete emulsification of any minor amount not previously fully emulsified. If any portion of the emulsified cement is in the form of oversize particles when the solvent is flashed or stripped from this portion, the resulting polymer cannot remain in colloidal suspension, but will deposit out and foul the equipment. From the hold tank, the emulsion is passed to a heater where a substantial portion of the solvent (but only a minor portion of water) is vaporized into gaseous bubbles, causing formation of a foam resembling whipped cream. The foam passes to a time tank to allow the solvent to reach its equilibrium concentration relative to the polymer throughout the foam. The foam is then cooled to 110° F. at about 10 psig, causing the solvent to condense and the foam to collapse. The condensed solvent forms a separate liquid phase from the aqueous emulsion phase. The mixture passes through a coalescer packed with steel wool into a separator. The separated solvent is transferred to the solvent surge tank. The emulsion is centrifuged and concentrated in a centrifuge where a quantity of serum is separated out and recycled to the serum storage tank. Since the polymer particles in the concentrated emulsion still contain solvent, the emulsion is passed through a second stage of foam formation, collapse and phase separation. The second stage separated solvent is also transferred to the solvent surge tank. The second stage emulsion phase is heated to 180° F. in a flash heater to flash off the remaining solvent in a flash tank. This solvent is condensed and stored in the solvent surge tank. Some water is also flashed from the flash tank, and is condensed, separated, and recycled to the surfactant solution tank. The latex from the flash tank contains about 24% rubber solids. It is cooled to 110° F. in an emulsion cooler, concentrated to 64% in a centrifuge and finally collected and stored in a latex product storage vessel. The serum spun out in the concentration step is recycled to the serum storage vessel.

Solvent removal from the emulsion comprising synthetic elastomer, 50-60 wt % solvent, water and emulsifying agent (surfactant) may comprise "weathering", by which is meant relatively quiescent storage periods under conditions whereby the solvent gradually evaporates. However, in most current applications (surgical gloves and condoms, for instance) the presence of residual solvent is not acceptable. Thus, solvent removal generally comprises flashing operations, distillation, or a foaming operation followed by phase separation of the solvent from the dilute latex. These processes may lead to a reduction in solvent content of 150 ppm or less after removal (calculated on a dilute aqueous rubber emulsion; the solvent content increases when the dilute aqueous emulsion is concentrated). The removal of solvent in the prior art processes is not without problems though.

Each of these operations are generally well understood and broadly disclosed in the art. However, that is not to mean that this step, requiring the removal of a solvent from a multiphase system without destabilizing the emulsion, is not a difficult one. Indeed, this step cannot be compared to the removal of a solvent from a simple two component system (water/solvent). Rather, given the presence of high molecular weight material, surfactant, low boiling hydrocarbon solvents, etc., this step often leads to a significant waste of latex material due to coagulation of the particles of emulsified rubber and fouling of the equipment. This is the reason that the solvent is removed in a multistep process at relatively equal solvent reduction steps. Other problems encountered at this stage are the reduced through-put and/or the increased energy consumption to reduce the solvent to the required low levels. A further problem is the residual level of foam control agents in the final product, which—together with the residual solvent content—should be as low as possible.

It is therefore an object of the present invention to provide an improved process of producing an artificial latex, wherein loss of material and fouling of the equipment in a solvent removal operation conducted in two or more steps is significantly reduced, in a manner that is more efficient in terms of through-put and energy consumption.

DISCLOSURE OF THE INVENTION

Accordingly, the invention provides a process for the preparation of an artificial latex, comprising the steps: (a) emulsification of a cement comprising a rubber dissolved in a suitable organic solvent, together with an aqueous surfactant solution, thus forming an oil-in-water emulsion; (b) step-wise reduction of the solvent content of the oil-in-water emulsion in two or more stages resulting in an artificial latex characterized in that stage 1 of step (b) part of the solvent is removed by mixing part of the artificial latex, heated to a temperature above the boiling point of the solvent with the emulsion and allowing the solvent to evaporate. In addition, the invention provides a continuous stirred vessel (1) for removing an organic solvent from an oil-in-water emulsion comprising rubber dissolved in an organic solvent, and emulsified with an aqueous surfactant solution to form an artificial latex with a reduced content of organic solvent, which vessel is equipped with a stirrer (2), a feed inlet (3), a vent outlet (for vaporized solvent and water) (4) and a product outlet (5), wherein the feed inlet (3) and the product outlet (5) are part of a reboiling loop (6) for recycling part of the aqueous emulsion product, wherein the reboiling loop (6) further comprises a product discharge outlet (7), optionally an inlet for a foam control agent (8), a circulation pump (9), a heating means (e.g., a heat exchanger) (10), an inlet for the oil-in-water emulsion (11), and optionally a steam-inlet (12).

DRAWING

Scheme I in FIG. 1 is a schematic representation of a comparative procedure for reducing the solvent content in an artificial latex process. The vessel (1) that is used is a continuously stirred vessel under steady state conditions equipped with a stirrer (2), a feed inlet (3), a vent outlet (4) and a product outlet (5). Moreover, the vessel has an inlet (12) for steam and inlets (8) and (11) directly connected to the vessel. The vent (4) is provided for the gaseous overheads, consisting of vaporized solvent and water vapours. In FIG. 1 a jacketed vessel is shown (wherein the jacket is heated by water or oil; whereas the vessel contents are additionally heated by steam).

Figure 2:
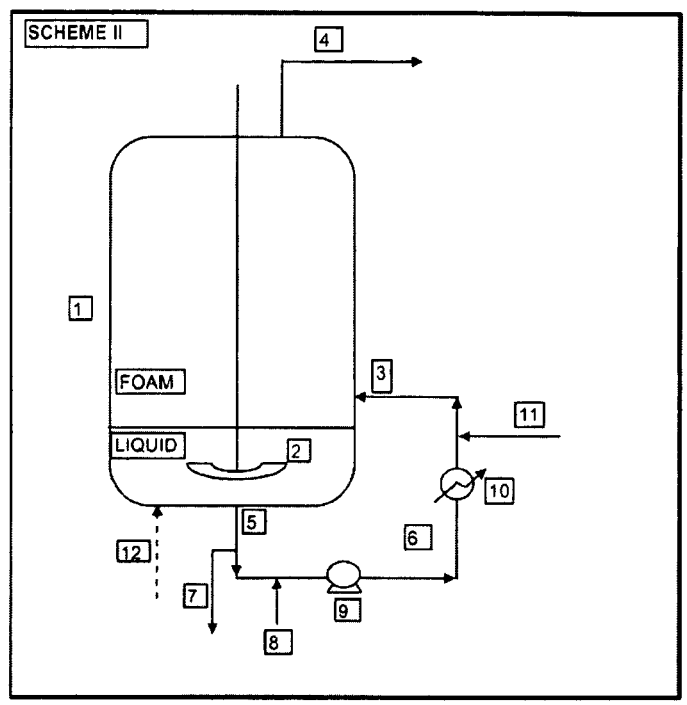

Scheme II in FIG. 2 is a schematic representation of a vessel as can be used in the process of the current invention. In this set-up the use of steam is optional. The hydrocarbon solvent is vaporized (flashed), by contact of the emulsion feed with part of the product stream, which has been heated to a temperature above the boiling point of the solvent in a heating means, e.g. the heat exchanger (10). The heat exchanger is therefore positioned preferably upstream of the joint combining the recycled product (an artificial latex with reduced solvent content) and the oil-in-water emulsion. In FIG. 2 an insulated vessel may also be used. It should also be appreciated that the vessel may be equipped with more than one reboiling loop.

The feed in both cases is the oil-in-water emulsion, comprising an emulsified mixture of rubber, surfactant, water and hydrocarbon solvent. Also, as discussed hereafter a foam control agent (FCA) may be used, and indeed preferably is used in the solvent reduction step (b).

The bottom zone of the vessel comprises a liquid phase, stripped of vaporized solvent, corresponding to the product of the stage 1 solvent reduction, with a lighter foam layer on top.

In steady state conditions this is kept at about the same level during operation. This bottom zone comprises from 15 to 25%, preferably about 20% of the height of the reactor vessel. The gas cap comprising the top part of the vessel and comprises from 20 to 10%, preferably about 20% of the height of the reactor vessel. If it is less than 10%, then there is a risk of foam entrainment at the vent outlet (4). If it is more, then the vessel is obviously not running at optimal capacity. The zone in between, which therefore covers about 45 to 75% of the height of the vessel, is filled with the foam generated during the solvent removal process. At equilibrium (stead state) the vessels operate at about essentially constant temperature and near to atmospheric pressure.

MODE(S) FOR CARRYING OUT THE INVENTION

In the process of the present invention, cement is formed by dissolving a rubber in a suitable hydrocarbon solvent. The rubber that is used to form the artificial latex can be any polymer, typically made by solvent polymerization, known in the art. This includes for example polyisobutylene and copolymers thereof, polyvinyl compounds such as acrylic and methacrylic acid esters and polyvinyl ethers and also cellulose derivatives, copolymers of styrene and conjugated diene(s) and or acrylonitrile and (co)polymers of diolefins. A further class of polymers are copolymers prepared from ethylene and one other monoolefin having up to 8 carbon atoms, such as the elastomeric copolymer of ethylene and propylene, the copolymer of ethylene and butane-1, and the like. Still another class of rubber like polymers are terpolymers obtained from ethylene, propylene and a diene such as 1,5-hexadiene and the like.

Of particular interest are (co)polymers of styrene and conjugated diene(s), which may be random polymers or block copolymers (containing homopolymer blocks and/or copolymer blocks.

Of even greater interest are (co)polymers of diolefins, with butadiene and isoprene as representatives of the dienes. Preferably, these (co)polymers, are polymerized by solution polymerization to a high cis-1,4-content (at least in the order of about 90%). These (co)polymers are further characterized by a (very) high molecular weight, typically in the range of at least 1,000,000 g/mole. Most preferably, they are made by anionic polymerization in the presence of a lithium catalyst, thus ensuring a very low ash content. However, they may also be made with a Ziegler type catalyst or catalyst based on Neodymium. Most preferably, the rubber like polymer is isoprene rubber, for instance any one of the grades commercially available from KRATON Polymers.

Note that the process of the present invention can also be utilized in the case when an artificial latex is made using bales of natural rubber.

The rubber, preferably isoprene rubber, may be dissolved in any suitable solvent. As for the solvent to be selected, its choice will depend somewhat on the exact nature of the rubber and the boiling point of the solvent itself. It is necessary that a solvent be used which will (quickly and easily) dissolve the rubber. For the less polar polymers used as rubber, the aliphatic hydrocarbon solvents having from four up to about ten carbon atoms are useful. These include isopentane, cyclopentane, n-pentane, the hexanes, the heptanes, octane, and the like. Preferably a solvent is used with a boiling point below 82 degrees Centigrade, preferably of at most 55 degrees Centigrade, more preferably selected from n-pentane, cyclopentane, n-hexane, cyclohexane, isomers and mixtures thereof. For isoprene rubber, the preferred solvent is n-pentane.

The amount of the rubber dissolved in the solvent will depend on and be limited by the solubility of the polymer in the solvent. In the case of isoprene rubber, the preferred amount, described as solids content, is less than about 20 percent by weight, preferably from about 8 to about 17 percent by weight, more preferably from about 10 to about 15 percent by weight. Another way to define the maximum amount of rubber is by the dynamic low shear viscosity of the cement, which should preferably be at or below 20,000 centipoises (Brookfield viscosity at room temperature).

The rubber may be dissolved into the solvent by any ordinary means. For instance, it may be dissolved in the solvent in a stirred tank. There are no specific conditions with respect to this preparatory step. Obviously, the safety conditions set out by the equipment manufacturer must be followed, and degradation of the rubber must be avoided.

After the cement is formed by dissolving the rubber in a suitable solvent, it is emulsified together with an aqueous surfactant solution to form an oil-in-water emulsion. With regard to the aqueous surfactant solution to be utilized, in principle any surfactant may be used. However, since the problem underlying the invention is to avoid foreign material that restricts the use of the latex so produced, the surfactant is preferably food and skin contact approved. For preparation of an IR latex, preferably a food and skin approved rosin acid type surfactant is used. Rosin acid type surfactants are preferred because of their relatively low foaming tendency.

The surfactant may be used in a concentration of between 0.5 and 5.0% by weight in water. More preferably, it is used in a concentration of between 0.75 and 3.0% w, still more preferably between 0.9 and 1.5% w. While more concentrated solutions may be used, they generally provide no advantages. Note in this regard that the hardness of the water used for the preparation of the surfactant solution can be important. Preferably very soft water (0-4 DH) or soft water (4-8 DH) is used for the preparation of the surfactant solution. Any ordinary means for making an aqueous surfactant solution may be used.

The volume ratio of aqueous surfactant solution versus cement is also rather predefined. Using too little aqueous surfactant may lead to a phase inversion, whereas using a significant excess will be troublesome in the subsequent step of removing the hydrocarbon solvent and in the subsequent step of concentrating the aqueous emulsion. Typically, the cement/surfactant ratio will be in the range of from about 1:1.5 to 1:3.0, preferably of from 1:2.0 to 1:2.5, by volume. Consequently, the initial solvent content is preferably about 50-60% w.

Emulsification of the cement with the aqueous surfactant solution may be carried out using a homogenizer or any similar means. Preferably a homogenizer or series of homogenizers is used that generates a stable oil-in-water emulsion with particles in the size upon solvent removal of from about 0.5 to 2 µm (median diameter). Neither coarser nor finer particle sizes bring any advantages.

It is worthwhile to note again that the removal of a solvent from a multicomponent system has been found to be not as straightforward as one would expect. The starting product is an oil-in-water emulsion, which in itself is rather complex. The solvent need to be removed from the emulsified "oil", without these emulsified particles destabilizing and coagulating. Moreover, for the subsequent use of the artificial latex, e.g. in the preparation of gloves and condoms, the amount of residual solvent need to be reduced to very low levels. Also the levels of foam control agent need to be low. Economically feasible processes moreover need to be able to create high throughputs which is difficult to achieve the more solvent is to be removed. The same is true for the energy consumption (heat required to evaporate the solvent).

To meet these contradictory requirements, the solvent removal step according to the present invention requires at least two solvent removal stages, whereby a significant solvent reduction is achieved in the first stage, followed by a second stage removal wherein the final low solvent levels are achieved.

The second stage is preferably carried out by stripping the solvent under elevated temperature and decreasing pressure conditions, above the boiling point of the solvent but below the boiling point of water, preferably a temperature in the range of 70-85 degrees Centigrade and pressure 0.2-1.0 bara. The second stage may be carried out in a single vessel or multiple vessels in series.

The first stage is preferably carried out by stripping the solvent under elevated temperature and about atmospheric pressure conditions, above the boiling point of the solvent but below the boiling point of water, preferably at a temperature in the range of 50-85 degrees Centigrade, at 0 to 100 millibar gauge (slight overpressure). This stage is by far the most difficult step in a solvent reduction operation. The problems involved in this stage concern excessive foaming on the one hand (which may cause loss of material during overfoaming and foam entrainment), and fouling on the other hand. Also, at this stage the oil-in-water emulsion is turned into an aqueous latex, which implies a risk of latex destabilisation. It should be appreciated that the volume reduction of the liquid product by evaporating the solvent (which initially may be as much as 50-60% w of the emulsion) is ca. 60% and that the volume reduction is near instantaneous. It is therefore quite surprising that the process of the current invention, under steady state conditions at an essentially constant temperature and an essentially constant pressure in a continuous stirred vessel as depicted in Scheme II provides an efficient, low fouling way to produce an artificial latex that has low residual solvent and foam control agents.

As is known from for instance, U.S. Pat. No. 3,250,737, there will be some foaming during the stripping of the solvent. Although in U.S. Pat. No. 3,250,737 it was indicated that the use of anti-foaming agent is not usually recommended, in the process of the current invention the use of such an agent, in minor amounts is rather preferred. The foam control agent (FCA) used in the process may be a polysiloxane or silica based agent or a combination thereof. The amount of FCA is preferably small, typically in ppm range. The amount is a function many factors such as the nature of the rubber and the solvent, the solids content of the rubber in the solvent, the amount of surfactant, etc. In other words, there is no specific upper and lower limit. Instead, it is recommended to perform a few scouting experiments on lab scale, which results can then be used when designing a larger production facility. Essential in this process is the use of a reboiling loop whereby part of the artificial latex produced in stage 1, is heated for instance by the heat exchanger, and is mixed with the oil-in water emulsion. This is done preferably in an amount sufficient to reduce the solvent content (by dilution) to at most 10% w, more preferably at mot 5% w. The weight ratio of the product stream versus the emulsion is preferably at least 20:1, more preferably at least 30:1.

As indicated, the recycled product stream preferably passes through a heat exchanger before it is mixed with the oil-in-water emulsion. Here it may be heated to a temperature above the boiling point of the solvent, but obviously below the boiling point of water. For instance, the heat exchanger may increase the temperature of the recycled artificial latex with reduced solvent content by 2 to 10 degrees Centigrade, preferably by 3 to 4 degrees Centigrade.

Recycling part of the product stream is the preferred manner of heating the reactor contents, albeit additional heating may be used (e.g., using a jacketed and/or steam heated vessel). The advantage of this preferred embodiment is that some of the solvent is already flashed from the oil-in-water emulsion before it enters the reactor vessel.

In stage 1, the solvent reduction operation may be carried out at a temperature sufficient to reduce the solvent content of the aqueous emulsion product to a range of from 0.5 to 1% w. In this embodiment the operation is preferably carried out at a temperature of from 75 to 85 degrees Centigrade. This embodiment has a lower residual solvent level as advantage, but relative to the preferred embodiment described hereafter results in a high level of fouling and problematic foam control requiring high FCA levels and limits and throughput.

In a more preferred embodiment, the stage 1 solvent reduction operation is carried out at a temperature sufficient to reduce the solvent content of the aqueous emulsion product in the first vessel to a range of from 1 to 3% w, preferably 1 to 2% w. In this preferred embodiment the operation in the vessel is preferably carried out at a temperature of from 50 to 70 degrees Centigrade, more preferably of from 55 to 65 degrees Centigrade. This embodiment has the advantage of high throughput in combination with reduced fouling and ease of foam control with relatively low FCA levels. The only disadvantage is the somewhat higher residual solvent level which has to be removed in the second stage.

As noted, the objective of the first stage is to reduce the solvent content from an original content, typically in the range of 50 to 60% wt to a significantly lower content, typically in the range of 0.05 to 3% wt. The operation and process conditions to achieve the desired level of reduction are mentioned above. Nonetheless, they may have to be optimised on the basis of the type of solvent, type of polymer and type of equipment that is used. On the other hand, these conditions may be easily determined once the person skilled in the art realizes that a more extensive solvent removal is required in this first stage than considered in an ordinary prior art processes. An example of a suitable set-up for this first stage may be found in the examples.

Next, the remaining solvent needs to be reduced to the desired low levels. Indeed, in many applications of artificial latex the presence of residual solvent is detrimental or even prohibited. It will be appreciated that the lower the required levels of solvent in the final artificial later, the more difficult or time consuming or energy consuming it is. Reducing to the currently claimed levels is tough, but achievable as long as the solvent levels have been significantly reduced during stage 1. By the two stage process step of the current invention, the inventors have succeeded in producing an artificial latex with excellent quality in a time and energy efficient manner. That this two stage process step could be so successful could not have been expected. Indeed, in a mere water/solvent system one would not have had to use a two-stage process and one would not have expected that this would improve the overall solvent reduction. The equipment to be used in this second stage is not limited. The same vessel may be used as has been used in stage 1. On the other hand, with the significant removal of solvent from the (complex) oil-in-water emulsion in stage 1, a wider range of equipment may be used in the subsequent step. For instance, in the subsequent step, a flash heater may be used, operating at a vacuum of 200 to 600 millibar. Thus, the solvent content may be reduced to the desired levels, with little or no fouling due to e.g., foaming and the like.

Also, in the second stage antifoaming agents may be used. The use of antifoaming agents is common and already described in U.S. Pat. No. 2,595,797 (e.g., a polysilicone oil).

The initial steps for making the oil-in-water emulsion may be carried out using any of the processes already known in the art. This includes each of the prior art references referred to in paragraphs, [0003] to [0008], included herein by reference, as well as NL287078; GB1004441; U.S. Pat. No. 3,249,566; U.S. Pat. No. 3,261,792; U.S. Pat. No. 3,268,501; U.S. Pat. No. 3,277,037; U.S. Pat. No. 3,281,386; U.S. Pat. No. 3,287,301; U.S. Pat. No. 3,285,869; U.S. Pat. No. 3,305,508; U.S. Pat. No. 3,310,151; U.S. Pat. No. 3,310,516; U.S. Pat. No. 3,313,759; U.S. Pat. No. 3,320,220; U.S. Pat. No. 3,294,719; GB1162569; GB1199325; U.S. Pat. No. 3,424,705; U.S. Pat. No. 3,445,414; SU265434; U.S. Pat. No. 3,503,917; U.S. Pat. No. 3,583,967; GB1327127; U.S. Pat. No. 3,644,263; U.S. Pat. No. 3,652,482;U.S. Pat. No. 3,808,166; U.S. Pat. No. 3,719,572; DE2245370; JP48038337; FR2153913; GB1296107; FR2172455; U.S. Pat. No. 3,815,655; U.S. Pat. No. 3,839,258; U.S. Pat. No. 3,842,052; GB1384591; U.S. Pat. No. 3,879,326; U.S. Pat. No. 3,892,698; U.S. Pat. No. 3,862,078; U.S. Pat. No. 3,879,327; U.S. Pat. No. 3,886,109; U.S. Pat. No. 3,920,601; JP51080344; JP50127950; JP54124042; JP54124040; U.S. Pat. No. 4,243,566; JP56161424; U.S. Pat. No. 4,344,859; SU1014834; JP58091702; SU1375629; JP1123834; SU520769 and RO102665; as well as U.S. Pat. No. 3,007,852; U.S. Pat. No. 3,622,127; U.S. Pat. No. 4,160,726; GB2051086; JP58147406; SU1058974; EP512736; JP8120124 and U.S. Pat. No. 6,075,073, also included herein by reference. Also the optional step of latex concentration has been described extensively in the prior art, typically by use of a centrifuge or by allowing the emulsion to cream for a sufficient amount of time (e.g., 24 hours) and removing serum (containing less than 2% w solids).

The following examples will further illustrate in greater detail how this invention may be carried out. However, it is not intended that the invention be restricted in any way thereto.

EXAMPLES

A rubber cement was prepared by dissolving a high-cis polyisoprene (MW of about 3 million, made by anionic polymerization) into n-pentane. This was carried out at a solids content of ca. 10% wt. An aqueous surfactant solution was prepared using a rosin-type surfactant at a concentration of ca. 1% wt.

Subsequently a stable oil-in water emulsion was prepared at a cement/aqueous surfactant ratio of 2.3 by volume. The oil-in-water emulsion was prepared in a continuous process using a homogenizer. The stable oil-in-water emulsion comprised ca. 55% wt of n-pentane.

The n-pentane based emulsion was subjected to a stage 1 continuous solvent removal. Either the comparative vessel as shown in Scheme 1 was used, or the vessel as shown in Scheme II. Thus, the first runs are comparative.
The Table below shows the conditions and the results of these runs. Product samples were taken and analyzed after the runs had lasted for at least 5 vessel residence times.

Conducting the solvent reduction operation at 60 degrees Centigrade resulted in less fouling while using less foam control agent. Example 9 to 11 therefore illustrate the preferred embodiment of the current invention.

The invention claimed is:
1. Process for the preparation of an artificial latex, comprising the steps:
 (a) emulsification of a cement comprising a rubber dissolved in a suitable organic solvent, together with an aqueous surfactant solution, thus forming an oil-in-water emulsion;
 (b) step-wise reduction of the solvent content of the oil-in-water emulsion in two or more stages resulting in an artificial latex characterized in that in stage 1 of step (b) part of the solvent is removed via use of a reboiling loop by mixing part of the artificial latex, heated to a temperature above the boiling point of the solvent with the oil-in-water emulsion and allowing the solvent to evaporate, said artificial latex and the oil-in-water emulsion are mixed in a weight ratio of at least 20:1.
2. The process as claimed in claim 1, wherein the artificial latex and the emulsion are mixed in a volume ratio such that the solvent content of the combined mixture is at most 5% by weight (5% w).
3. The process as claimed in claim 1, wherein a foam control agent is used in one or more stages of step (b) to reduce foaming.
4. The process as claimed in claim 1, wherein a continuous stirred vessel is utilized, which is equipped with a stirring means, a feed inlet, a vent outlet and a product outlet, wherein the feed inlet and the product outlet are part of a reboiling loop for recycling part of the artificial latex, wherein the reboiling loop further comprises a product discharge outlet, optionally an inlet for a foam control agent, a circulation pump, a heating means, an inlet for the oil-in-water emulsion, and optionally a steam-inlet.
5. A The process as claimed in claim 1, wherein the emulsion has an initial solvent content in the range of from 50 to 60% w, based on the entire emulsion.
6. A The process as claimed in claim 1, wherein the artificial latex prepared in stage 1 of step (b) has a reduced solvent content vis-à-vis the initial content, in the range of from 0.05 to 3% w, based on the entire emulsion.

Table of Examples

| Example | Set-up[a] | Temperature[b] (° C.) | Feed/volume[c] (h-1) | FCAd) (units) | Residual solvent[e] (% w) | Fouling[f] (%) |
|---|---|---|---|---|---|---|
| 1 | I | 80 | 0.2 | 100 | 2 | >10 |
| 2 | I | 80 | 0.1 | 50 | 1.5 | >10 |
| 3 | I | 60 | 0.2 | 50 | 2.5 | <5 |
| 4 | I | 60 | 0.1 | 25 | 2 | <5 |
| 5 | I | 50 | 0.4 | none | 36 | nihil |
| 6 | I | 50 | 0.2 | none | 32 | nihil |
| 7 | II | 80 | 0.07 | 25 | 0.5 | 10 |
| 8 | II | 80 | 0.14 | 30 | 1 | 10 |
| 9 | II | 60 | 0.14 | 25 | 2 | <3 |
| 10 | II | 60 | 0.1 | 20 | 1.5-2 | <3 |
| 11 | II | 60 | 0.07 | 5 | 1.5 | <3 |

[a] Relate to Schemes I and II represented in the above
[b] Temperature measured at liquid level inside vessel; for Scheme I a combination of jacket heating and steam input was applied with steam/feed ratio <0.1 (w/w); recirculate ratio for Scheme II = 20:1
[c] Ratio of feed rate (e.g. m3/h) vs volume (e.g. m3)
d) FCA dosage rate basis feed rate required for foam control; example 1 set at 100 units
[e] Residual solvent on liquid weight basis
[f] Fouling = rubber loss from emulsion inside vessel and reboiling loop (Scheme II)

The results in the Table above clearly indicate that the two stage process step of the current invention, using the vessel of Scheme II is more efficient in terms of reduced fouling at similar residual solvent levels. This is moreover achieved at reduced amounts of foam control agent. Comparing example 10 (according to the invention) with comparative example 4, it may be noticed that at the same temperature and feed rate a similar residual solvent level is achieved with less foam control agent and less fouling.

7. The process as claimed in claim 1, wherein the artificial latex at the end of step (b) has a solvent content of less than 150 ppm.

8. The process as claimed in claim 1, wherein the first stage of step (b) is conducted by stripping the solvent under elevated temperature and about atmospheric pressure conditions, above the boiling point of the solvent but below the boiling point of water, at a temperature in the range of 50-85 degrees Centigrade, at 0 to 100 millibar gauge.

9. The process as claimed in claim 4, wherein the reboiling loop is equipped with a heat exchanger as heating means, upstream of the joint combining the recycled artificial latex and the oil-in-water emulsion.

10. The process as claimed in claim 9, wherein the heat exchanger increases the temperature of the recycled artificial latex by 2 to 10 degrees Centigrade.

11. The process as claimed in claim 1, carried out at a temperature sufficient to reduce the solvent content of the emulsion in stage 1 of step (b) to a range of from 0.5 to 1.0% w.

12. The process as claimed in claim 11, carried out at a temperature of from 75 to 85 degrees Centigrade.

13. The process as claimed in claim 1, carried out at a temperature sufficient to reduce the solvent content of the emulsion in stage 1 of step (b) to a range of from 1.0 to 3.0% w.

14. The process as claimed in claim 13, carried out at a temperature of from 50 to 70 degrees Centigrade.

15. The process as claimed in claim 1, wherein the second stage of step (b) is conducted by stripping the solvent under elevated temperature and reduced pressure conditions, above the boiling point of the solvent but below the boiling point of water, at a temperature from 70 to 85 degrees Centigrade, and a reduced pressure from 200 to 600 millibars.

16. The process as claimed in claim 1, wherein the rubber is isoprene rubber.

17. The process as claimed in claim 1, wherein the amount of rubber dissolved in the solvent is less than about 20 percent by weight.

18. The process as claimed in claim 1, wherein the solvent is an organic solvent having a boiling point of at most 82 degrees Centigrade, and selected from the group consisting of pentane, cyclopentane, hexane, cyclohexane, isomers and mixtures thereof.

* * * * *